United States Patent
Lin et al.

(10) Patent No.: US 11,770,556 B2
(45) Date of Patent: Sep. 26, 2023

(54) METHOD AND APPARATUS FOR PROCESSING INTRA PREDICTION MODE

(71) Applicant: Huawei Technologies Co., Ltd., Shenzhen (CN)

(72) Inventors: Yongbing Lin, Beijing (CN); Xiaozhen Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 17/121,263

(22) Filed: Dec. 14, 2020

(65) Prior Publication Data

US 2021/0168399 A1 Jun. 3, 2021

Related U.S. Application Data

(63) Continuation of application No. 16/201,580, filed on Nov. 27, 2018, now Pat. No. 10,887,620, which is a (Continued)

(30) Foreign Application Priority Data

Jul. 1, 2011 (CN) .......................... 201110184369.9

(51) Int. Cl.
*H04N 19/176* (2014.01)
*H04N 19/593* (2014.01)
(Continued)

(52) U.S. Cl.
CPC .......... *H04N 19/593* (2014.11); *H04N 19/11* (2014.11); *H04N 19/176* (2014.11); *H04N 19/196* (2014.11)

(58) Field of Classification Search
CPC .... H04N 19/176; H04N 19/11; H04N 19/593; H04N 19/196
See application file for complete search history.

(56) References Cited

U.S. PATENT DOCUMENTS

| 2007/0002945 A1 | 1/2007 | Kim |
| 2011/0038414 A1 | 2/2011 | Song et al. |

(Continued)

FOREIGN PATENT DOCUMENTS

| CN | 1556652 A | 12/2004 |
| CN | 101350927 A | 1/2009 |

(Continued)

OTHER PUBLICATIONS

Wiegand et al., "Overview of the H.264/AVC Video Coding Standard," IEEE Transactions on Circuits and Systems for Video Technology, vol. 13, No. 7, pp. 560-576, Institute of Electrical and Electronics Engineers, New York, New York (Jul. 2003).

(Continued)

*Primary Examiner* — Dave Czekaj
*Assistant Examiner* — Berteau Joisil
(74) *Attorney, Agent, or Firm* — Leydig, Voit & Mayer, Ltd.

(57) ABSTRACT

A method for processing an intra prediction mode includes: determining whether an intra prediction mode of each neighboring block in multiple neighboring blocks of a current block is applicable to the current block; and obtaining multiple mapped intra prediction modes of the current block according to a result of the determining, if it is determined that an intra prediction mode of a neighboring block is applicable to the current block, setting the intra prediction mode of the neighboring block as a mapped intra prediction mode of the current block, and if it is determined that the intra prediction mode of the neighboring block is not applicable to the current block, setting a specific intra prediction mode as the mapped intra prediction mode of the current block.

20 Claims, 5 Drawing Sheets

```
┌─────────────────────────────────────────────┐
│ Determine whether an intra prediction mode  │ ─── 110
│ of each neighboring block in multiple       │
│ neighboring blocks of a current block is    │
│ applicable to the current block             │
└─────────────────────────────────────────────┘
                      │
                      ▼
┌─────────────────────────────────────────────┐
│ Obtain multiple mapped intra prediction     │
│ modes of the current block according to a   │
│ result of the determining, in a case in     │
│ which it is determined that an intra        │
│ prediction mode of a neighboring block is   │ ─── 120
│ applicable to the current block, set the    │
│ intra prediction mode of the neighboring    │
│ block as a mapped intra prediction mode of  │
│ the current block, and in a case in which   │
│ it is determined that the intra prediction  │
│ mode of the neighboring block is not        │
│ applicable to the current block, set a      │
│ specific intra prediction mode as the       │
│ mapped intra prediction mode of the current │
│ block                                       │
└─────────────────────────────────────────────┘
```

Related U.S. Application Data continuation of application No. 15/684,352, filed on Aug. 23, 2017, now Pat. No. 10,154,284, which is a continuation of application No. 14/363,248, filed as application No. PCT/CN2011/081899 on Nov. 8, 2011, now Pat. No. 9,769,497.

(51) Int. Cl.
*H04N 19/196* (2014.01)
*H04N 19/11* (2014.01)

(56) References Cited

U.S. PATENT DOCUMENTS

| | | | |
|---|---|---|---|
| 2012/0082222 | A1 | 4/2012 | Wang et al. |
| 2013/0329788 | A1 | 12/2013 | Song et al. |

FOREIGN PATENT DOCUMENTS

| | | | |
|---|---|---|---|
| CN | 101500161 | A | 8/2009 |
| CN | 101605255 | A | 12/2009 |
| CN | 101677406 | A | 3/2010 |
| CN | 101877792 | A | 11/2010 |
| CN | 102006481 | A | 4/2011 |
| EP | 1871117 | A1 | 12/2007 |
| KR | 20110018188 | A | 2/2011 |

OTHER PUBLICATIONS

Davies et al., "Suggestion for a Test Model," Joint Collaborative Team on Video Coding (JCT-VC) of ITU-T SG16 WP3 and ISO/IEC JTC1/SC29/WG11, Dresden, DE, JCTVC-A033, pp. 1-30 (Apr. 15-23, 2010).

Ye et al., "Improved H.264 Intra Coding Based on Bi-Directional Intra Prediction, Directional Transform, and Adaptive Coefficient Scanning," 15th IEEE International Conference on Image Processing, San Diego, California, pp. 2116-2119, Institute of Electrical and Electronics Engineers, New York, New York (Oct. 12-15, 2008).

Guo et al., "Improved Intra Mode Coding", Joint Collaborative Team on Video Coding (JCT-VC) of ITU-T SG16 WP3 and ISO/IEC JTC1/SC29/WG11, Daegu, Korea, JCTVC-D166, WG11 No. m18918, pp. 1-7 (Jan. 20-28, 2011).

Guo et al., "CEM Subtest 1: Intra Most Probable Mode Signaling for Luma," Joint Collaborative Team on Video Coding (JCT-VC) of ITU-T SG16 WP3 and ISO/IEC JTC1/SC29/WG11, Geneva, Switzeriand, JCTVC-E088, pp. 1-3 (Mar. 16-23, 2011).

Tan, "CE14.1: Results for DOCOMO's proposal and cross verification of MediaTek's implementation for the most probable mode signalling for luma," Joint Collaborative Team on Video Coding (JCT-VC) of ITU-T SG16 WP3 and ISO/IEC JTC1/SC29/WG11, Geneva, CH, JCTVC-E131, WG11 No. m19647, pp. 1-7, (Mar. 16-23, 2011).

Chien et al., "Parsing friendly intra mode coding," Joint Collaborative Team on Video Coding (JCT-VC) of ITU-T SG16 WP3and ISO/IEC JTC1/SC29WG11, Torino, IT, JCTVC-F459, pp. 1-5 (Jul. 14-22, 2011).

"Series H: Audiovisual and Multimedia Systems; Infrastructure of audiovisual services—Coding of moving video Advanced video coding for generic audiovisual services," ITU-T Recommendation H.264, International Telecommunication Union, Geneva, Switzerland (Nov. 2007).

Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, Geneva, CH, JCTVC-E603 (Mar. 16-23, 2011).

"Information technology—Coding of moving pictures and associated audio for digital storage media at up to about 1,5 Mbit/s—Part 2: Video," Technical Corrigendum 2, ISO/IEC 11172-2:1993/Cor. 2:1999(E) (Dec. 1, 1999).

U.S. Appl. No. 16/201,580, filed Nov. 27, 2018.
U.S. Appl. No. 15/684,352, filed Aug. 23, 2017.
U.S. Appl. No. 14/363,248, filed Jun. 24, 2014.

METHOD AND APPARATUS FOR PROCESSING INTRA PREDICTION MODE

CROSS-REFERENCE TO RELATED APPLICATIONS

This application is a continuation of U.S. patent application Ser. No. 16/201,580, filed on Nov. 27, 2018, which is a continuation of U.S. patent application Ser. No. 15/684,352, filed on Aug. 23, 2017, now U.S. Pat. No. 10,154,284, which is a continuation of U.S. patent application Ser. No. 14/363,248, filed on Jun. 24, 2014, now U.S. Pat. No. 9,769,497, which is a National Stage of International Application No. PCT/CN2011/081899, filed on Nov. 8, 2011. The International Application claims priority to Chinese Patent Application No. 201110184369.9, filed on Jul. 1, 2011. All of the aforementioned patent applications are hereby incorporated by reference in their entireties.

TECHNICAL FIELD

Embodiments of the present invention relate to the field of image processing, and specifically, to a method and an apparatus for processing an intra prediction mode.

BACKGROUND

A basic principle of video coding compression is to remove redundancy as much as possible by using relevance between space domains, relevance between time domains, and relevance between code words. Currently, a popular method is to implement video coding compression by using a block-based mixed video coding frame, and by using steps such as prediction, transformation, quantification, and entropy coding. From an earliest MPEG-1 to an latest video coding standard H.264/AVC, and even a next generation of video coding compression standard which is being formulated by a JCTVC working group (a joint working group founded by MPEG and VECG), and high efficiency video coding (HEVC) all use the block-based mixed video coding frame.

An intra coding technology in a standard H.264 uses relevance of a neighboring block and uses multi-direction prediction to improve prediction precision. For example, in the H.264, there are nine IPmodes (Intra Prediction mode, intra prediction modes) for prediction of a 4×4 luminance component, including eight directional intra prediction modes and one non-directional prediction mode, that is, a DC mode (Direct Current mode, direct current prediction mode) or referred to as a DC prediction mode. The directional intra prediction mode actually represents information of different texture directions. In an intra coding technology, prediction is performed according to the intra prediction mode, so as to obtain a prediction residual error, then, transformation, quantification, and entropy coding are performed on the residual error, and finally, a compressed code stream is generated. At a decoding end, a decoded image is obtained after decoding is performed according to the intra prediction mode and information of the prediction residual error. Correspondingly, coding and decoding need to be performed on the intra prediction mode.

In a coding and decoding method stipulated in the H.264, an intra prediction mode of a current block is coded by using a coding manner based on an MPM (Most Probable Mode, most probable mode), and a specific process is as follows: 1) an MPM of the current block is predicted according to information of an intra prediction mode of a neighboring block; and 2) then the intra prediction mode of the current block is coded according to the MPM.

A HEVC draft standard uses a CU (Coding Unit, coding unit), a PU (Prediction Unit, prediction unit), and a TU (Transform Unit, Transform Unit), which are divided into multiple units by function, and a new tree structure is used to describe these units, for example, the CU may be divided into smaller CUs according to a quadtree, and the smaller CUs may be further divided, thereby forming a quadtree structure. The PU and the TU also have similar tree structures. The CU, the PU, and the TU all essentially belong to a concept of a block (block) or a sub-block (sub-block), the CU is similar to a macro block MB or a coding block, the PU may be referred to as a prediction block, the TU may correspond to a transform block, and the like. In the HEVC draft standard, they are collectively referred to as a Tree-Block, so as to reflect a tree structure characteristic.

In the HEVC draft standard, an intra prediction technology thereof is similar to that in the H.264 and a multi-direction prediction technology is also used, but the number of block sizes and the number of prediction directions are further extended therein. In a coding and decoding method stipulated in the HEVC draft standard, the intra prediction mode of the current block is coded by using an MPM-based coding manner.

In order to obtain the MPM, both the H.264 and the HEVC draft include a mapping process of mapping the intra prediction mode of the neighboring block to obtain an MPM corresponding to the current block, and an LUT table (Look-up Table, look-up Table) is introduced into the mapping process. Specifically, according to the intra prediction mode of the neighboring block, the MPM of the current block can be obtained by looking up the LUT table, that is, an input of the LUT table is the intra prediction mode of the neighboring block, and an output is the MPM of the current block. The LUT table is generally obtained according to relevance of a texture direction corresponding to the intra prediction mode. In addition, the HEVC involves block sizes in multiple sizes and different corresponding value ranges (for example, 0-2, 0-4, 0-16, 0-33, and the like) of the intra prediction mode, and therefore, in the HEVC draft, multiple LUT tables are introduced into the foregoing mapping process.

However, multiple LUT tables need to be used in the mapping process, so that a certain memory overhead is occupied, and a system resource utilization rate is reduced.

SUMMARY

Embodiments of the present invention provide a method and an apparatus for processing an intra prediction mode, which can improve a system resource utilization rate.

According to an embodiment of the present invention, a method for processing an intra prediction mode is provided, including: determining whether an intra prediction mode of each neighboring block in multiple neighboring blocks of a current block is applicable to the current block; obtaining multiple mapped intra prediction modes of the current block according to a result of the determining, if it is determined that an intra prediction mode of a neighboring block is applicable to the current block, setting the intra prediction mode of the neighboring block as a mapped intra prediction mode of the current block, and if it is determined that the intra prediction mode of the neighboring block is not applicable to the current block, setting a specific intra prediction mode as the mapped intra prediction mode of the current block; and determining whether the multiple mapped intra prediction modes of the current block are the same, and if the multiple mapped intra prediction modes of the current block are the same, setting the mapped intra prediction mode of the current block by using the specific intra prediction mode.

According to another embodiment of the present invention, an apparatus for processing an intra prediction mode is provided, including: a determining module, configured to determine whether an intra prediction mode of each neighboring block in multiple neighboring blocks of a current block is applicable to the current block; and a setting module, configured to obtain multiple mapped intra prediction modes of the current block according to a result of the determining, where the setting module is configured to: if it is determined that an intra prediction mode of a neighboring block is applicable to the current block, set the intra prediction mode of the neighboring block as a mapped intra prediction mode of the current block, and if it is determined that the intra prediction mode of the neighboring block is not applicable to the current block, set a specific intra prediction mode as the mapped intra prediction mode of the current block.

In the embodiments of the present invention, when multiple mapped intra prediction modes of a current block are obtained by means of mapping, if it is determined that an intra prediction mode of a neighboring block is not applicable to the current block, a specific intra prediction mode is set as a mapped intra prediction mode of the current block, so that it is unnecessary to look up an LUT table in the mapping process, thereby saving a memory overhead and improving a system resource utilization rate.

BRIEF DESCRIPTION OF DRAWINGS

To describe the technical solutions in embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in embodiments of the present invention with reference to the accompanying drawings in the embodiments of the present invention. Apparently, the described embodiments are merely a part of the embodiments of the present invention rather than all of the embodiments. All other embodiments obtained by a person of ordinary skill in the art based on the embodiments of the present invention without creative efforts shall fall within the protection scope of the present invention.

Figure 1:
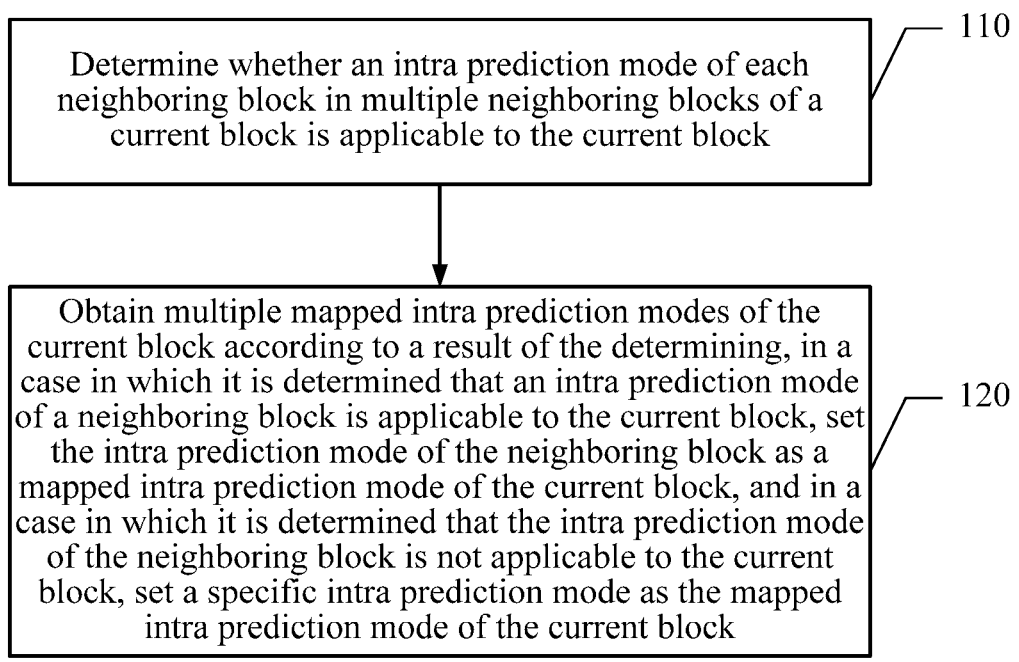
FIG. 1 shows a flowchart of a method for processing an intra prediction mode according to an embodiment of the present invention.

FIG. 1 shows a flowchart of a method for processing an intra prediction mode according to an embodiment of the present invention.

As shown in FIG. 1, in 110, it is determined whether an intra prediction mode of each neighboring block in multiple neighboring blocks of a current block is applicable to the current block. In 120, multiple MPMs (or a set formed by multiple MPMs) of the current block are obtained according to a result of the determining, if it is determined that an intra prediction mode of a neighboring block is applicable to the current block, the intra prediction mode of the neighboring block is set as an MPM of the current block, and if it is determined that the intra prediction mode of the neighboring block is not applicable to the current block, a specific intra prediction mode is set as the MPM of the current block. The MPM herein is referred to as a most probable mode or a mapped intra prediction mode.

In an intra prediction process of an image frame, the image frame is divided into multiple blocks, and an MPM that can be used by the current block is determined separately according to the intra prediction mode of each neighboring block in the multiple neighboring blocks of the current block, thereby obtaining a set formed by multiple MPMs. In other words, a corresponding MPM may be obtained for the current block according to each neighboring block in the multiple neighboring blocks. According to the embodiment of the present invention, if it is determined that an intra prediction mode of a certain neighboring block of the current block can be used for the current block, the intra prediction mode of the neighboring block may be directly used as the MPM; and if it is determined that the intra prediction mode of the certain neighboring block cannot be used for the current block, the specific intra prediction mode is used as the MPM of the current block. By analog, the multiple MPMs of the current block may be separately determined according to the multiple neighboring blocks, thereby obtaining the set formed by the multiple MPMs.

According to the method for processing an intra prediction mode provided by the embodiment of the present invention, if it is determined that an intra prediction mode of a neighboring block is applicable to a current block, the intra prediction mode of the neighboring block is set as an MPM of the current block, and if it is determined that the intra prediction mode of the neighboring block is not applicable to the current block, a specific intra prediction mode is set as the MPM of the current block, so that multiple MPMs of the current block can be obtained without looking up an LUT table, so as to implement mapping of the intra prediction mode, thereby saving a memory overhead and improving a system resource utilization rate.

The following describes 110 and 120 of the method for processing an intra prediction mode according to the embodiment of the present invention by using an example.

In 110 of the method, it is determined whether the intra prediction mode of each neighboring block in the multiple neighboring blocks of the current block is applicable to the current block.

According to the embodiment of the present invention, when intra prediction of an image frame is performed, by using the HEVC as an example, there may be 33 prediction directions (that is, directional intra prediction modes), and non-directional intra prediction modes such as a DC prediction mode and a planar prediction mode (also referred to as a Planar mode), that is, there may be 35 intra prediction modes. In addition, block sizes in multiple sizes may be further defined, and a block in each size corresponds to one determined value range of an intra prediction mode. For example, when intra prediction is performed on a luminance component, for a 4×4 luminance block, a value range of the intra prediction mode is 0-16, for an 8×8 luminance block, a value range of the intra prediction mode is 0-33, for a 64×64 luminance block, a value range of the intra prediction mode is 0-4, and the like, which are specifically shown in Table 1. However, the embodiment of the present invention is not limited thereto. For example, in another application of intra prediction (for example, the H.264), there may also be another number (for example, nine) of intra prediction modes and a corresponding value range.

TABLE 1

| Block type | Value range of IPmode |
|---|---|
| 2 × 2 | 0-2 |
| 4 × 4 | 0-16 |
| 8 × 8 | 0-33 |
| 16 × 16 | 0-33 |
| 32 × 32 | 0-33 |
| 64 × 64 | 0-4 |

Each intra prediction mode may correspond to one prediction manner, including directional prediction and non-directional prediction. For example, IPmode=0 and IPmode=1 respectively represent that prediction is performed along a vertical direction and a horizontal direction, and IPmode=0 and IPmode=1 are directional prediction manners and can be used for coding a texture in a specific direction. For another example, IPmode=2 represents the DC prediction mode, and a calculation process of a DC value of the DC prediction mode includes: averaging reference pixels corresponding to the current block, and using the DC value as a prediction value of the current block. It can be seen that prediction in the DC prediction mode is independent of a certain specific texture direction, and the prediction in the DC prediction mode is non-directional prediction and can be used for coding a smooth texture. In addition, another non-directional prediction mode, that is, the planar prediction mode, may be further defined, and a prediction process of the planar prediction mode includes: using reference pixels to perform interpolation in the horizontal direction and the vertical direction separately, and then performing averaging, thereby performing prediction on each pixel point. The planar prediction mode is similar to the DC prediction mode, is irrelevant to a texture direction, and can also be used for coding the smooth texture. For signaling transfer, the planar prediction mode and the DC prediction mode may share an intra prediction mode, or may have their own intra prediction mode separately. An example herein is a case in which the DC prediction mode and the planar prediction mode share an intra prediction mode. If the DC prediction mode and the planar prediction mode have their own mode value, for example, in the foregoing example, a mode value 0 is assigned to the planar prediction mode, and all other mode values are added by 1 successively, and a corresponding value of the DC prediction mode is 3.

Each current block may be surrounded by blocks in various sizes, for example, there may be at least one 64×64 neighboring block, or one 16×16 neighboring block, or four 4×4 neighboring blocks, or the like, on the left side of a block with a size of 16×16, and at least one 16×16 neighboring block or two 8×8 neighboring blocks, or the like, at least on the upper side of the 16×16 block. When intra prediction is performed, for each current block, multiple neighboring blocks, in different sizes, of the current block may be selected for determining, so as to determine whether an intra prediction mode of each neighboring block in the selected multiple neighboring blocks in different sizes is applicable to the current block.

According to an embodiment of the present invention, when an intra prediction mode of a neighboring block is one of multiple intra prediction modes that can be used by a current block, it is determined that the intra prediction mode of the neighboring block is applicable to the current block; and when the intra prediction mode of the neighboring block is not one of the multiple intra prediction modes that can be used by the current block, it is determined that the intra prediction mode of the neighboring block is not applicable to the current block. Herein, that the intra prediction mode of the neighboring block is one of multiple intra prediction modes that can be used by the current block means that a value of the intra prediction mode of the neighboring block is within a value range of an intra prediction mode of the current block, and that the intra prediction mode of the neighboring block is not one of the multiple intra prediction modes that can be used by the current block means that the value of the intra prediction mode of the neighboring block is not within the value range of the intra prediction mode of the current block. For example, a size of the current block is 4×4 (the value range of the intra prediction mode of the current block is 0-16), and a size of a neighboring block of the current block is 8×8 (a value of an intra prediction mode of the neighboring block is 0-33), and if the value of the intra prediction mode of the neighboring block is 8, that is, within the range of 0-16, it may be determined that the intra prediction mode of the neighboring block is applicable to the current block. For another example, if the value of the intra prediction mode of the neighboring block is 17, and 17 is beyond the value range of 0-16 of the current block, it may be determined that the intra prediction mode of the neighboring block is not applicable to the current block. By analog, it may be determined whether each of the intra prediction modes of the multiple neighboring blocks is applicable to the current block.

Further, according to an embodiment of the present invention, the determining whether an intra prediction mode of a neighboring block is applicable to a current block further includes the following cases:

When the neighboring block and the current block are in a same strip, the neighboring block is an intra coding block, and the intra prediction mode of the neighboring block is one of multiple intra prediction modes that can be used by the current block, it is determined that the intra prediction mode of the neighboring block is applicable to the current block.

When the neighboring block and the current block are not in the same strip, or the neighboring block is not an intra coding block, or the intra prediction mode of the neighboring block is not one of the multiple intra prediction modes that can be used by the current block, it is determined that the intra prediction mode of the neighboring block is not applicable to the current block. According to an embodiment of the present invention, the foregoing multiple neighboring blocks may include a neighboring block located on the upper side of the current block and a neighboring block located on the left side of the current block. However, the embodiment of the present invention is not limited thereto, and in the embodiment of the present invention, neighboring pixels on other sides except the left side and the upper side may be used. For example, according to the embodiment of the present invention, the neighboring block may further include a neighboring block located on an upper left side of the current block.

In 120 of the method, the multiple MPMs of the current block are obtained according to the result of the determining, in the case in which it is determined that the intra prediction mode of the neighboring block is applicable to the current block, the intra prediction mode of the neighboring block is set as the MPM of the current block, and in the case in which it is determined that the intra prediction mode of the neighboring block is not applicable to the current block, the specific intra prediction mode is set as the MPM of the current block.

In the embodiment of the present invention, the specific intra prediction mode may be a preset intra prediction mode, for example, the DC prediction mode, or the planar prediction mode, or another non-directional prediction mode. However, the embodiment of the present invention is not limited thereto, and the foregoing specific intra prediction mode may also be another certain intra prediction mode which is applicable to all blocks of an image frame to some extent.

The multiple MPMs of the current block may include multiple MPMs obtained separately according to the multiple neighboring blocks. The following is an example of mapping an intra prediction mode to obtain the multiple MPMs of the current block. An input of the mapping process is the intra prediction mode of the neighboring block, and an output is the MPM of the current block. During mapping, it is first determined whether the intra prediction mode of the neighboring block is applicable to the current block, and if applicable, the MPM of the current block is the intra prediction mode of the neighboring block; and if not applicable, the MPM of the current block is the DC prediction mode.

It is assumed that the current block is 4×4 (0-16), and an intra prediction mode of a neighboring block 8×8 (0-33) of the current block is IPmode8 (that is, a value of the intra prediction mode of the neighboring block is 8). In order to obtain the MPM of the current block, mapping represented by the following logic language needs to be performed on IPmode8:

if (IPmode 8>16) MPM=DC
else MPM=IPmode8

That is, if the intra prediction mode of the neighboring block does not belong to the value range of the intra prediction mode of the current block, the MPM of the current block is set as the DC prediction mode; otherwise, the MPM of the current block is set to be equal to the intra prediction mode of the neighboring block. By iterative execution of the foregoing logic on the multiple neighboring blocks of the current block, the multiple MPMs of the current block can be obtained.

It should be noted that, in the embodiment of the present invention, that the intra prediction mode is mapped to the DC prediction mode is used as an example, and actually, the intra prediction mode may also be mapped to another non-directional prediction mode, for example, the planar prediction mode. Certainly, it may be required that these non-directional prediction modes are applicable to the current block, that is, fall within the value range of the intra prediction mode of the current block.

In the embodiment provided by the present invention, after the mapped intra prediction mode of the current block is obtained according to the neighboring block, it may be further determined whether the mapped intra prediction modes MPMs obtained according to the multiple neighboring blocks of the current block are the same, and if the mapped intra prediction modes MPMs obtained according to the multiple neighboring blocks of the current block are the same, the mapped intra prediction mode of the current block is set by using the specific intra prediction mode.

According to the embodiment of the present invention, the specific intra prediction mode may be a preset intra prediction mode, including the DC prediction mode and the planar prediction mode. The obtained mapped intra prediction mode includes mapped intra prediction modes of the neighboring blocks on the left side and the upper side.

For example, for the mapped intra prediction mode of the current block, if the mapped intra prediction mode obtained according to the neighboring block on the left side is equal to the mapped intra prediction mode obtained according to the neighboring block on the upper side, it can be considered to replace one of the two with a specific intra prediction mode different from the two, so as to avoid a case of extra bit occupation brought in this case. Certainly, it further needs to be determined whether the mapped intra prediction mode is one of the specific intra prediction mode, that is, the planar prediction mode (or the DC prediction mode); if the mapped intra prediction mode is one of the specific intra prediction mode, the mapped intra prediction mode of the neighboring block on the left side or the upper side is set as the DC prediction mode (or the planar prediction mode); and if the mapped intra prediction mode is not one of the specific intra prediction mode, the mapped intra prediction mode of the neighboring block on the left side or the upper side is set as one of the specific intra prediction mode, that is, the planar prediction mode or the DC prediction mode. In this way, it can be avoided that the mapped intra prediction mode that is of the current block and is obtained according to the neighboring block on the left side is still the same as the mapped intra prediction mode that is obtained according to the neighboring block on the upper side.

If the mapped prediction modes of the neighboring blocks on the left side and the upper side of the current block are all the DC prediction mode, it may be seen that the mapped intra prediction mode of the neighboring block on the left side is equal to the mapped intra prediction mode of the neighboring block on the upper side. In addition, the DC prediction mode is one of the specific prediction modes, and therefore, the mapped intra prediction mode of the neighboring block on the left side is set as a specific intra prediction mode different from the DC prediction mode, that is, the planar prediction mode, and the mapped intra prediction mode of the neighboring block on the upper side is still the DC prediction mode.

When three or more mapped intra prediction modes for the current block can be obtained according to more neighboring blocks, and some of these mapped intra prediction modes are the same, the specific intra prediction mode may also be used to replace one or two of these mapped intra prediction modes.

According to an embodiment of the present invention, when an intra prediction mode of a neighboring block is not suitable for a current block, the intra prediction mode of the neighboring block is mapped to a non-directional prediction mode, such as a DC prediction mode or a planar prediction mode, so that mapping of an intra prediction mode can be implemented without looking up an LUT table, thereby saving a memory overhead and improving a system resource utilization rate.

Figure 2:
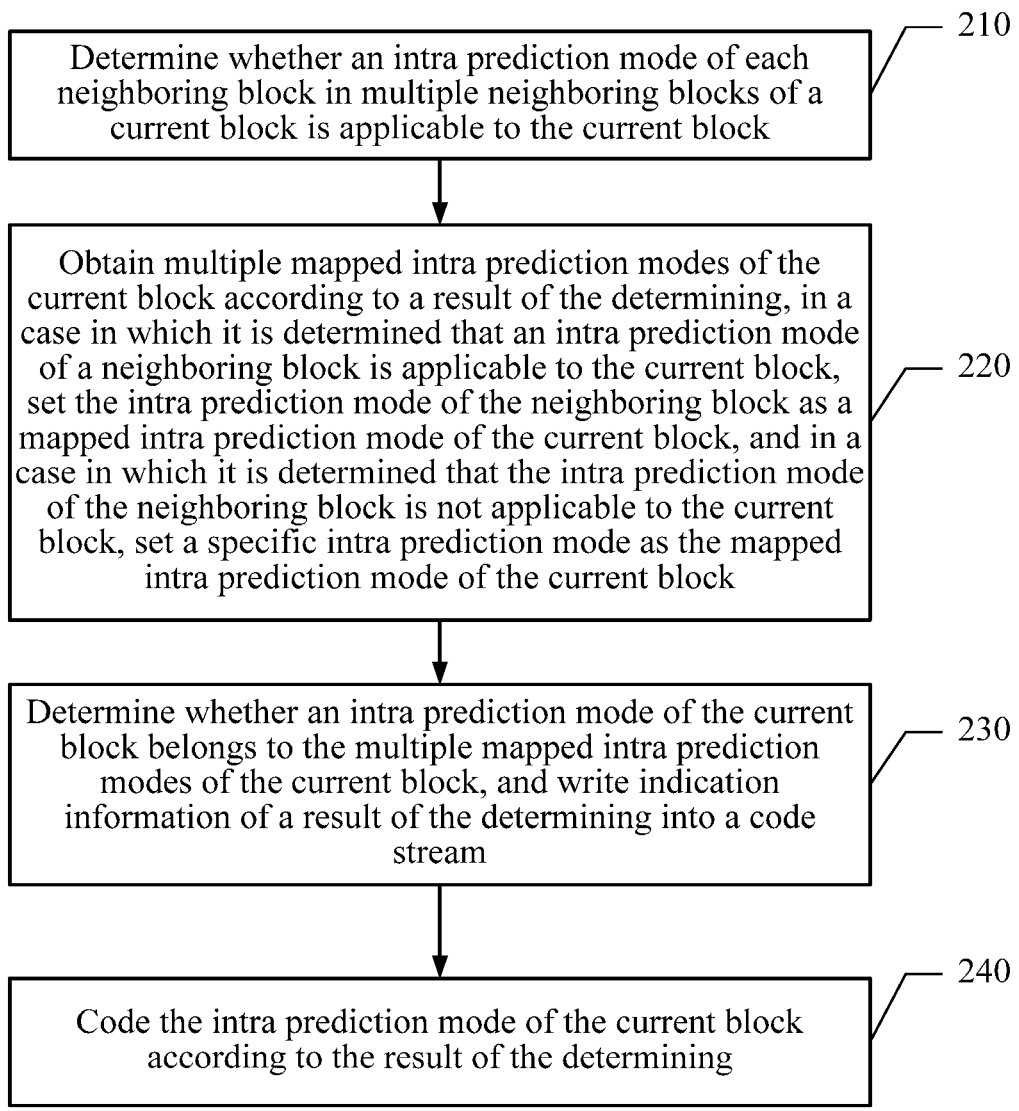
FIG. 2 shows a flowchart of a method for processing an intra prediction mode according to another embodiment of the present invention.

FIG. 2 shows a flowchart of a method for processing an intra prediction mode according to another embodiment of the present invention. At a coding end, in order to effectively code an intra prediction mode of a current block, coding may be performed based on an MPM.

210 and 220 in FIG. 2 are similar to 110 and 120 in FIG. 1, respectively. For example, first, multiple MPMs of a current block may be obtained according to an intra prediction mode of each neighboring block in multiple neighboring blocks, that is, intra prediction modes of the multiple neighboring blocks are mapped to obtain the multiple MPMs of the current block. Specifically, it may be determined whether an intra prediction mode of a neighboring block is applicable to the current block (whether the intra prediction mode of the neighboring block falls within a value range of an intra prediction mode of the current block). If applicable, an MPM of the current block is the intra prediction mode of the neighboring block. If not applicable, the MPM of the current block is a certain determined prediction mode (for example, a non-directional prediction mode, a DC prediction mode, or a planar prediction mode). For example, the foregoing mapping method may be used to map a neighboring block on the upper side of the current block, so as to obtain a corresponding MPM (referred to as an MPM_above) of the current block, and the foregoing mapping method may also be used to map a neighboring block on the left side of the current block, so as to obtain a corresponding MPM (referred to as an MPM_left) of the current block.

Herein, when there are multiple neighboring blocks on the upper side of the current block, multiple corresponding MPMs_above may also be obtained, or, when there are multiple neighboring blocks on the left side of the current block, multiple corresponding MPMs_left may also be obtained, which is not limited in the embodiment of the present invention.

In addition, the method in FIG. 2 further includes 230: Determine whether the intra prediction mode of the current block belongs to the multiple MPMs of the current block, and write indication information of a result of the determining into a code stream; and 240: Code the intra prediction mode of the current block according to the result of the determining.

For example, it is determined whether an intra prediction mode belongs to the multiple MPMs, in other words, whether the intra prediction mode belongs to the multiple MPMs (or a set formed by the multiple MPMs), and information that indicates the result of the determining is written into the code stream. For example, it is determined whether an intra prediction mode selected by the current block belongs to a set S formed by the MPM_above and the MPM_left, and the information that indicates the result of the determining is written into the code stream. The intra prediction mode selected by the current block may be an intra prediction mode that is selected by the current block and meets a certain requirement (for example, being optimal in rate-distortion (Rate-distortion) performance). A value "1" or "0" of a flag in the code stream may be used to represent the result of the determining.

Then, the intra prediction mode of the current block is coded according to the result of the determining. For example, when the result of the determining is that the intra prediction mode selected by the current block does not belong to the set S formed by the MPM_above and the MPM_left, the intra prediction mode of the current block is directly coded. When the result of the determining is that the intra prediction mode selected by current block belongs to the set S formed by the MPM_above and the MPM_left, an index number of the intra prediction mode of the current block in the set S is coded.

According to the method for processing an intra prediction mode provided by the embodiment of the present invention, when an intra prediction mode of a neighboring block is not applicable to a current block, an MPM of the current block is mapped to a non-directional prediction mode, for example, a DC prediction mode or a planar prediction mode, so that a mapping process can be implemented without looking up an LUT table, thereby saving a memory overhead and improving a system resource utilization rate.

Figure 3:
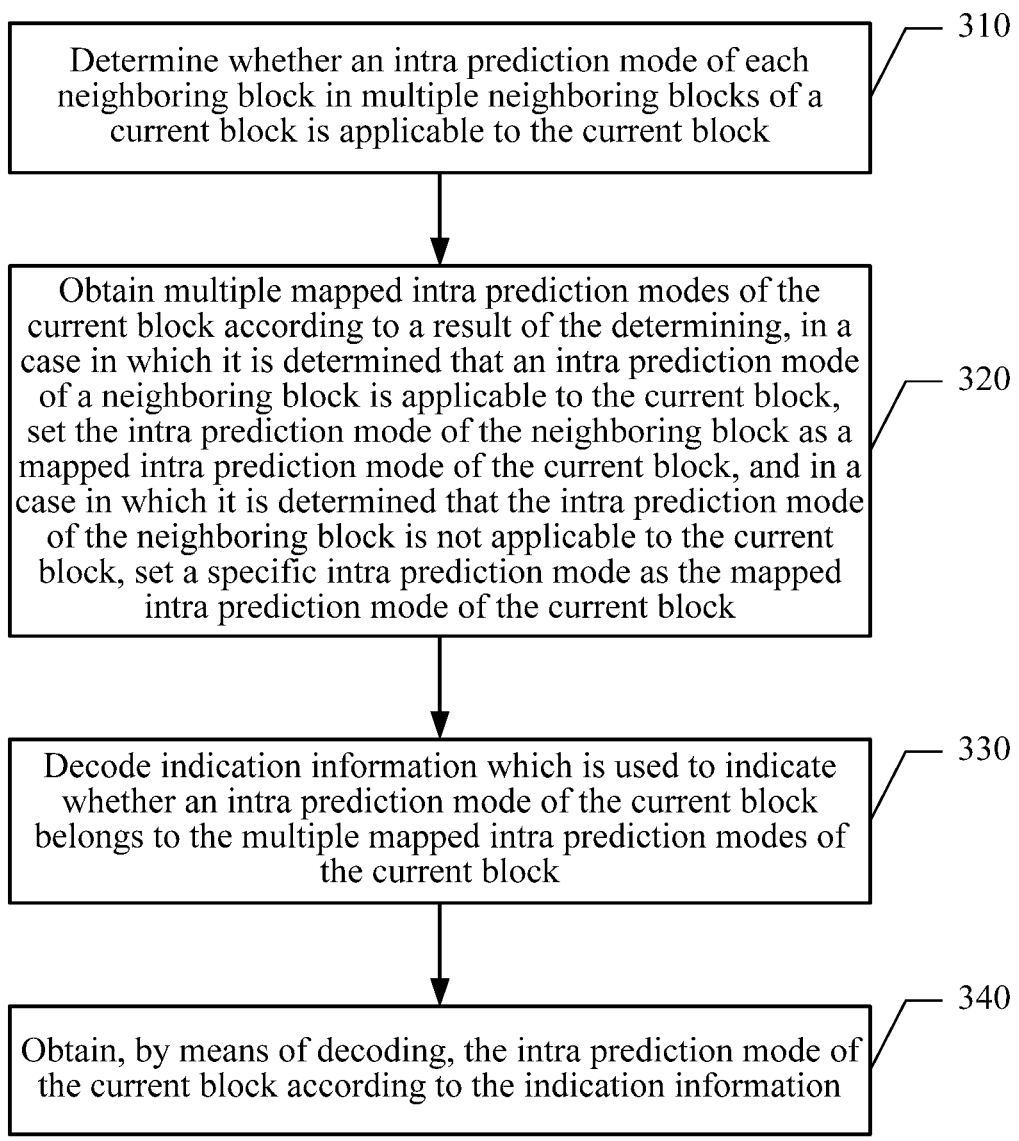
FIG. 3 shows a flowchart of a method for processing an intra prediction mode according to still another embodiment of the present invention.

FIG. 3 shows a flowchart of a method for processing an intra prediction mode according to still another embodiment of the present invention. Corresponding to a coding end, at a decoding end, decoding may be performed based on an MPM.

310 and 320 in FIG. 3 are similar to 110 and 120 in FIG. 1, respectively. For example, first, multiple MPMs of a current block may be obtained according to an intra prediction mode of each neighboring block in multiple neighboring blocks, that is, intra prediction modes of the multiple neighboring blocks are mapped to obtain the multiple MPMs of the current block. Specifically, it is determined whether an intra prediction mode of a neighboring block is applicable to the current block (whether the intra prediction mode of the neighboring block falls within a value range of an intra prediction mode of the current block). If applicable, an MPM of the current block is the intra prediction mode of the neighboring block; and if not applicable, the MPM of the current block is a certain determined prediction mode (for example, a non-directional prediction mode, a DC prediction mode, or a planar prediction mode). For example, the foregoing mapping method may be used to map a neighboring block on the upper side of the current block, so as to obtain a corresponding MPM (referred to as an MPM_above) of the current block, and the foregoing mapping method may also be used to map a neighboring block on the left side of the current block, so as to obtain a corresponding MPM (referred to as an MPM_left) of the current block.

Herein, when there are multiple neighboring blocks on the upper side of the current block, multiple corresponding MPMs_above may also be obtained, or, when there are multiple neighboring blocks on the left side of the current block, multiple corresponding MPMs_left may also be obtained, which is not limited in the embodiment of the present invention.

In addition, the method in FIG. 3 further includes 330: Decode indication information, where the indication information is used to indicate whether the intra prediction mode of the current block belongs to a set S formed by the multiple MPMs of the foregoing current block; and 340: Obtain, by means of decoding, the intra prediction mode of the current block according to the indication information.

For example, a code stream may be decoded, that is, related information of an intra prediction mode in the code stream may be decoded according to the set S formed by the multiple MPMs. For example, indication information about whether the intra prediction mode of the current block belongs to the set S may be decoded, where the information indicates whether the intra prediction mode of the current block belongs to a set S formed by the MPM_above and the MPM_left.

Then, according to the foregoing indication information, the intra prediction mode of the current block may be obtained by means of further decoding. For example, when the indication information indicates that the intra prediction mode of the current block does not belong to the set S formed by the MPM_above and the MPM_left, decoding continues to be performed to directly obtain the intra prediction mode of the current block. When the indication information indicates that the intra prediction mode of the current block belongs to the set S formed by the MPM_above and the MPM_left, decoding continues to be performed to obtain an index number of the intra prediction mode of the current block in the set S, and a corresponding MPM in the set S is found according to the index number, where the MPM is used as the intra prediction mode of the current block.

According to the method for processing an intra prediction mode provided by the embodiment of the present invention, when an intra prediction mode of a neighboring block is not applicable to a current block, an MPM of the current block is mapped to a non-directional prediction mode, for example, a DC prediction mode or a planar prediction mode, so that a mapping process can be implemented without looking up an LUT table, thereby saving a memory overhead and improving a system resource utilization rate.

Figure 4:
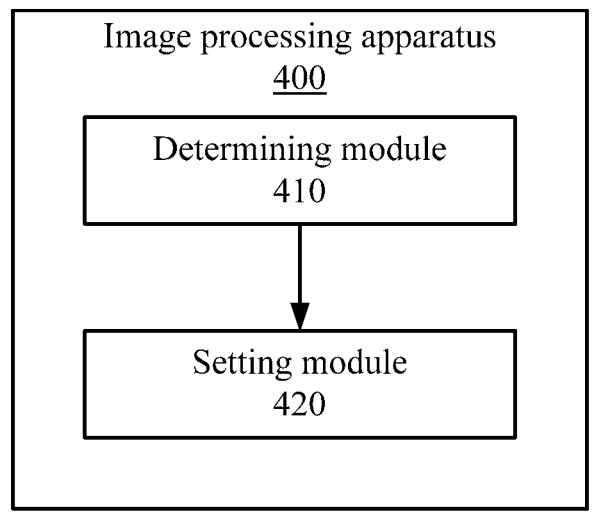
FIG. 4 shows a structural diagram of an apparatus for processing an intra prediction mode according to an embodiment of the present invention.
Figure 5:
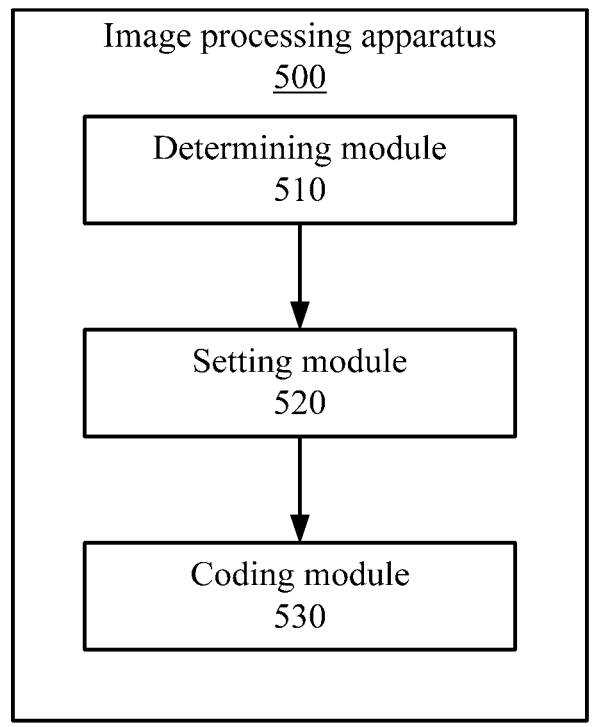
FIG. 5 shows a structural diagram of an apparatus for processing an intra prediction mode according to another embodiment of the present invention.
Figure 6:
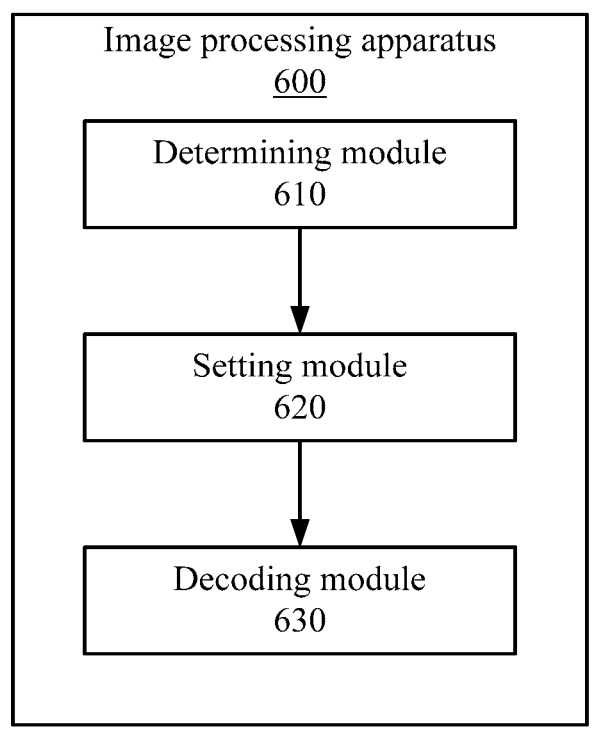
FIG. 6 shows a structural diagram of an apparatus for processing an intra prediction mode according to still another embodiment of the present invention.

The foregoing describes the method for processing an intra prediction mode according to the embodiment of the present invention, and the following separately describes structural block diagrams of an apparatus for processing an intra prediction mode according to an embodiment of the present invention with reference to FIG. 4, FIG. 5 and FIG. 6.

FIG. 4 shows a structural diagram of an apparatus 400 for processing an intra prediction mode according to an embodiment of the present invention. The apparatus 400 in FIG. 4 includes a determining module 410 and a setting module 420.

The determining module 410 is configured to determine whether an intra prediction mode of each neighboring block in multiple neighboring blocks of a current block is applicable to the current block. The setting module 420 is configured to obtain multiple MPMs of the current block according to a result of the determining, where the setting module is configured to: if it is determined that an intra prediction mode of a neighboring block is applicable to the current block, set the intra prediction mode of the neighboring block as an MPM of the current block, and if it is determined that the intra prediction mode of the neighboring block is not applicable to the current block, set a specific intra prediction mode as the MPM of the current block.

For the foregoing and other operations and/or functions of the determining module 410 and the setting module 420 of the apparatus 400 for processing an intra prediction mode, reference may be made to the foregoing 110 and 120 of the method in FIG. 1, and details are not described herein again to avoid repetition.

According to the apparatus for processing an intra prediction mode provided by the embodiment of the present invention, if it is determined that an intra prediction mode of a neighboring block is not applicable to a current block, a specific intra prediction mode is set as an MPM of the current block, so that multiple MPMs of the current block can be obtained without looking up an LUT table, thereby saving a memory overhead and improving a system resource utilization rate.

FIG. 5 shows a structural diagram of an apparatus for processing an intra prediction mode according to another embodiment of the present invention. A determining module 510 and a setting module 520 of an apparatus 500 in FIG. 5 are similar to the determining module 410 and the setting module 420 in FIG. 4, respectively, and therefore, detailed descriptions are appropriately omitted.

According to an embodiment of the present invention, when an intra prediction mode of a neighboring block is one of multiple intra prediction modes that can be used by a current block, the determining module 510 determines that the intra prediction mode of the neighboring block is applicable to the current block; and when the intra prediction mode of the neighboring block is not one of the multiple intra prediction modes that can be used by the current block, the determining module 510 determines that the intra prediction mode of the neighboring block is not applicable to the current block. Herein, that an intra prediction mode of a neighboring block is one of multiple intra prediction modes that can be used by a current block means that a value of the intra prediction mode of the neighboring block is within a value range of an intra prediction mode of the current block, and that the intra prediction mode of the neighboring block is not one of the multiple intra prediction modes that can be used by the current block means that the value of the intra prediction mode of the neighboring block is not within the value range of the intra prediction mode of the current block.

According to an embodiment of the present invention, a specific intra prediction mode set by the setting module 520 may include a DC prediction mode or a planar prediction mode.

According to an embodiment of the present invention, multiple neighboring blocks include a neighboring block located on the upper side of the current block and a neighboring block located on the left side of the current block.

According to an embodiment of the present invention, the apparatus 500 for processing an intra prediction mode further includes a coding unit 530. The coding unit 530 determines whether the intra prediction mode of the current block belongs to multiple MPMs of the current block, and writes indication information of a result of the determining into a code stream, and the coding unit 530 codes the intra prediction mode of the current block according to the result of the determining.

According to the apparatus for processing an intra prediction mode provided by the embodiment of the present invention, if it is determined that an intra prediction mode of a neighboring block is not applicable to a current block, a specific intra prediction mode is set as an MPM of the current block, so that multiple MPMs of the current block can be obtained without looking up an LUT table, thereby saving a memory overhead and improving a system resource utilization rate.

FIG. 6 shows a structural diagram of an apparatus for processing an intra prediction mode according to still another embodiment of the present invention. A determining module 610 and a setting module 620 of an apparatus 600 in FIG. 6 are similar to the determining module 410 and the setting module 420 in FIG. 4, respectively, and therefore, detailed descriptions are appropriately omitted.

According to an embodiment of the present invention, when a value of an intra prediction mode of a neighboring block is within a value range of an intra prediction mode of a current block, the determining module 610 determines that an intra prediction mode of a neighboring block is applicable to the current block; and when the value of the intra prediction mode of the neighboring block is not within the value range of the intra prediction mode of the current block, the determining module 610 determines that the intra prediction mode of the neighboring block is not applicable to the current block.

According to an embodiment of the present invention, a specific intra prediction mode set by the setting module 620 may include a DC prediction mode or a planar prediction mode.

According to an embodiment of the present invention, multiple neighboring blocks include a neighboring block located on the upper side of the current block and a neighboring block located on the left side of the current block. According to the embodiment of the present invention, the multiple neighboring blocks may further include a neighboring block located on an upper left side of the current block.

According to an embodiment of the present invention, the apparatus 600 further includes a decoding unit 630. The decoding unit 630 is configured to decode indication information, where the indication information is used to indicate whether the intra prediction mode of the current block belongs to multiple MPMs of the current block, and the decoding unit 630 obtains, by means of decoding, the intra prediction mode of the current block according to the indication information.

According to the apparatus for processing an intra prediction mode provided by the embodiment of the present invention, if it is determined that an intra prediction mode of a neighboring block is not applicable to a current block, a specific intra prediction mode is set as an MPM of the current block, so that multiple MPMs of the current block can be obtained without looking up an LUT table, thereby saving a memory overhead and improving a system resource utilization rate.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided by the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method for processing an intra prediction mode, comprising:
    determining, by an apparatus, whether an intra prediction mode of a first neighboring block of a current block is applicable to the current block and whether an intra prediction mode of a second neighboring block of the current block is applicable to the current block, wherein the first neighboring block is on a left side of the current block and the second neighboring block is on an upper side of the current block; and
    based on both the intra prediction mode of the first neighboring block being applicable to the current block and the intra prediction mode of the second neighboring block being applicable to the current block:
        determining, by the apparatus, whether the intra prediction mode of the first neighboring block is the same as the intra prediction mode of the second neighboring block; and
        setting, by the apparatus, mapped intra prediction modes of the current block based on whether or not the intra prediction mode of the first neighboring block is the same as the intra prediction mode of the second neighboring block;
    wherein:

in case that the intra prediction mode of the first neighboring block is the same as the intra prediction mode of the second neighboring block, the intra prediction mode of the first neighboring block is set as a mapped intra prediction mode of the current block, and a different intra prediction mode is set as another mapped intra prediction mode of the current block; and in case that the intra prediction mode of the first neighboring block is not the same as the intra prediction mode of the second neighboring block, the intra prediction mode of the first neighboring block and the intra prediction mode of the second neighboring block are set as mapped intra prediction modes of the current block.

2. The method of claim 1, wherein setting the different intra prediction mode as the other mapped intra prediction mode of the current block comprises:
selecting a preset intra prediction mode to replace the intra prediction mode of the second neighboring block, wherein the preset intra prediction mode comprises a direct current (DC) prediction mode or a planar prediction mode.

3. The method of claim 1, wherein determining whether the intra prediction mode of the first neighboring block of the current block is applicable to the current block is based on a value of the intra prediction mode of the first neighboring block.

4. The method of claim 3, wherein the intra prediction mode of the first neighboring block is determined as being applicable to the current block based on the value of the intra prediction mode of the first neighboring block being within an intra prediction mode value range of the current block.

5. The method of claim 1, wherein determining whether the intra prediction mode of the first neighboring block of the current block is applicable to the current block is based on whether the first neighboring block and the current block are in a same slice.

6. The method of claim 1, further comprising:
determining whether an intra prediction mode of the current block belongs to a plurality of mapped intra prediction modes of the current block, and writing indication information of whether the intra prediction mode of the current block belongs to the plurality of mapped intra prediction modes of the current block into a code stream; and
coding the intra prediction mode of the current block according to whether the intra prediction mode of the current block belongs to the plurality of mapped intra prediction modes of the current block.

7. The method of claim 1, further comprising:
decoding indication information, wherein the indication information indicates whether an intra prediction mode of the current block belongs to a plurality of mapped intra prediction modes of the current block; and
obtaining the intra prediction mode of the current block according to the indication information.

8. The method of claim 1, further comprising:
based on a mapped intra prediction mode of the current block that is obtained according to the first neighboring block being the same as a mapped intra prediction mode that is obtained according to the second neighboring block, determining whether the same mapped intra prediction mode is a non-directional intra prediction mode; and
based on determining whether the same mapped intra prediction mode is the non-directional intra prediction mode, selecting between a specific intra prediction mode and another non-directional intra prediction mode to replace the mapped intra prediction mode that is obtained according to the first neighboring block;
wherein the specific intra prediction mode is selected in case that the same mapped intra prediction mode is the non-directional intra prediction mode, and the other non-directional intra prediction mode is selected in case that the same mapped intra prediction mode is not the non-directional intra prediction mode.

9. An apparatus for processing an intra prediction mode, comprising:
a non-transitory memory having processor-executable instructions stored thereon; and
a processor, coupled to the memory, configured to execute the processor-executable instructions to facilitate:
determining whether an intra prediction mode of a first neighboring block of a current block is applicable to the current block and whether an intra prediction mode of a second neighboring block of the current block is applicable to the current block, wherein the first neighboring block is on a left side of the current block and the second neighboring block is on an upper side of the current block; and
based on both the intra prediction mode of the first neighboring block being applicable to the current block and the intra prediction mode of the second neighboring block being applicable to the current block:
determining whether the intra prediction mode of the first neighboring block is the same as the intra prediction mode of the second neighboring block; and
setting mapped intra prediction modes of the current block based on whether or not the intra prediction mode of the first neighboring block is the same as the intra prediction mode of the second neighboring block;
wherein:
in case that the intra prediction mode of the first neighboring block is the same as the intra prediction mode of the second neighboring block, the intra prediction mode of the first neighboring block is set as a mapped intra prediction mode of the current block, and a different intra prediction mode is set as another mapped intra prediction mode of the current block; and
in case that the intra prediction mode of the first neighboring block is not the same as the intra prediction mode of the second neighboring block, the intra prediction mode of the first neighboring block and the intra prediction mode of the second neighboring block are set as mapped intra prediction modes of the current block.

10. The apparatus of claim 9, wherein the processor is further configured to execute the processor-executable instructions to facilitate:
based on a mapped intra prediction mode of the current block that is obtained according to the first neighboring block being the same as a mapped intra prediction mode that is obtained according to the second neighboring block, determining whether the same mapped intra prediction mode is a preset intra prediction mode; and
based on the same mapped intra prediction mode being the preset intra prediction mode, selecting another preset intra prediction mode to replace the mapped intra prediction mode that is obtained according to the first neighboring block.

11. The apparatus of claim 9, wherein the processor is further configured to execute the processor-executable instructions to facilitate:

based on a mapped intra prediction mode of the current block that is obtained according to the first neighboring block being the same as a mapped intra prediction mode that is obtained according to the second neighboring block, determining whether the same mapped intra prediction mode is a preset intra prediction mode; and based on the same mapped intra prediction mode not being the preset intra prediction mode, selecting the preset intra prediction mode to replace the mapped intra prediction mode that is obtained according to the first neighboring block.

12. The apparatus of claim 9, wherein setting the different intra prediction mode as the other mapped intra prediction mode of the current block comprises:

selecting a preset intra prediction mode to replace the intra prediction mode of the second neighboring block, wherein the preset intra prediction mode comprises a direct current (DC) prediction mode or a planar prediction mode.

13. The apparatus of claim 9, wherein determining whether the intra prediction mode of the first neighboring block of the current block is applicable to the current block is based on a value of the intra prediction mode of the first neighboring block.

14. The apparatus of claim 13, wherein the intra prediction mode of the neighboring block is determined as being applicable to the current block based on the value of the intra prediction mode being within an intra prediction mode value range of the current block.

15. The apparatus of claim 9, wherein determining whether the intra prediction mode of the first neighboring block of the current block is applicable to the current block is based on whether the first neighboring block and the current block are in a same slice.

16. The apparatus of claim 9, wherein the apparatus is an encoder, and wherein the processor is further configured to execute the processor-executable instructions to facilitate:

determining whether an intra prediction mode of the current block belongs to a plurality of mapped intra prediction modes of the current block, and writing indication information of whether the intra prediction mode of the current block belongs to the plurality of mapped intra prediction modes of the current block into a code stream; and coding the intra prediction mode of the current block according to whether the intra prediction mode of the current block belongs to the plurality of mapped intra prediction modes of the current block.

17. The apparatus of claim 9, wherein the apparatus is a decoder, and wherein the processor is further configured to execute the processor-executable instructions to facilitate:

decoding indication information, wherein the indication information indicates whether an intra prediction mode of the current block belongs to a plurality of mapped intra prediction modes of the current block; and obtaining the intra prediction mode of the current block according to the indication information.

18. A non-transitory computer-readable medium having processor-executable instructions stored thereon for processing an intra prediction mode, wherein the processor-executable instructions, when executed, facilitate:

determining whether an intra prediction mode of a first neighboring block of a current block is applicable to the current block and whether an intra prediction mode of a second neighboring block of the current block is applicable to the current block, wherein the first neighboring block is on a left side of the current block and the second neighboring block is on an upper side of the current block; and based on both the intra prediction mode of the first neighboring block being applicable to the current block and the intra prediction mode of the second neighboring block being applicable to the current block:

determining whether the intra prediction mode of the first neighboring block is the same as the intra prediction mode of the second neighboring block; and setting mapped intra prediction modes of the current block based on whether or not the intra prediction mode of the first neighboring block is the same as the intra prediction mode of the second neighboring block;

wherein:

in case that the intra prediction mode of the first neighboring block is the same as the intra prediction mode of the second neighboring block, the intra prediction mode of the first neighboring block is set as a mapped intra prediction mode of the current block, and a different intra prediction mode is set as another mapped intra prediction mode of the current block; and in case that the intra prediction mode of the first neighboring block is not the same as the intra prediction mode of the second neighboring block, the intra prediction mode of the first neighboring block and the intra prediction mode of the second neighboring block are set as mapped intra prediction modes of the current block.

19. The non-transitory computer-readable medium of claim 18, wherein determining whether the intra prediction mode of the first neighboring block of the current block is applicable to the current block is based on whether the first neighboring block and the current block are in a same slice.

20. The non-transitory computer-readable medium of claim 18, wherein setting the different intra prediction mode as the other mapped intra prediction mode of the current block comprises:

selecting a preset intra prediction mode to replace the intra prediction mode of the second neighboring block, wherein the preset intra prediction mode comprises a direct current (DC) prediction mode or a planar prediction mode.

* * * * *

UNITED STATES PATENT AND TRADEMARK OFFICE
CERTIFICATE OF CORRECTION

| | |
|---|---|
| PATENT NO. | : 11,770,556 B2 |
| APPLICATION NO. | : 17/121263 |
| DATED | : September 26, 2023 |
| INVENTOR(S) | : Lin et al. |

It is certified that error appears in the above-identified patent and that said Letters Patent is hereby corrected as shown below:

On the Title Page

Page 2: Other Publications, Right-Hand Column, Line 8: "Guo et al., "CEM Subtest 1: Intra Most Probable Mode Signaling" should read -- Guo et al., "CE14 Subtest 1: The Most Probable Mode Signaling --.

Page 2: Other Publications, Right-Hand Column, Line 10: "ITU-T SG16 WP3 and ISO/IEC JTC1/SC29/WG11, Geneva," should read -- ITU-T SG16 WP3 and ISO/IEC JTC1/SC29/WG11, 5th Meeting, Geneva, --.

Signed and Sealed this
Sixteenth Day of April, 2024

Katherine Kelly Vidal
*Director of the United States Patent and Trademark Office*